United States Patent [19]

Falk

[11] 3,992,063
[45] Nov. 16, 1976

[54] BRAKE PRESSURE DISTRIBUTION VALVE AND SYSTEM

[75] Inventor: Edward J. Falk, St. Louis County, Mo.

[73] Assignee: Wagner Electric Corporation, Parsippany, N.J.

[22] Filed: Nov. 6, 1975

[21] Appl. No.: 629,643

[52] U.S. Cl. .............................. 303/6 C
[51] Int. Cl.² ........................... B60T 8/26
[58] Field of Search .......... 60/564, 591; 188/349; 303/6 C, 6 R

[56] References Cited
UNITED STATES PATENTS

| | | | |
|---|---|---|---|
| 3,290,882 | 12/1966 | Oberthur | 303/6 C X |
| 3,473,849 | 10/1969 | Smith et al. | 303/6 C |
| 3,488,095 | 1/1970 | Rath | 303/6 C |
| 3,492,052 | 1/1970 | Klimek | 303/6 C |
| 3,738,708 | 6/1973 | Kawaguchi et al. | 303/6 C |
| 3,880,471 | 4/1975 | Lewis | 303/6 C |

*Primary Examiner*—Duane A. Reger
*Attorney, Agent, or Firm*—James R. Bell

[57] ABSTRACT

A brake pressure distribution valve includes a housing having a cavity formed therein. First and second pistons are movably mounted in the housing, each being resiliently urged in opposite directions. The second piston is mounted on the first piston for relative movement therewith. A retainer on the first piston can engage the second piston for unitary movement of both pistons. A first seal is provided to sealingly separate a first atmospheric portion at one end of the cavity from a pressurized fluid portion of the cavity. A second seal is provided to sealingly separate a second atmospheric portion at the other end of the cavity, opposite the one end, from the pressurized fluid portion. Ports in the housing permit pressurized fluid into and out of the pressurized fluid portion of the cavity. A passage may be provided axially through the first piston to interconnect the first and second atmospheric portions of the cavity. The valve may be used in a vehicle brake system including a master cylinder, front and rear brakes and conduit interconnecting the master cylinder with the brakes. The valve may be interconnected with the conduit between the master cylinder and the front brakes to predeterminately control the flow of the pressurized fluid to the front and/or the rear brakes to proportion the outlet pressure of the valve at a predeterminately varying rate in relation to the inlet pressure thereof.

8 Claims, 4 Drawing Figures

3,992,063

BRAKE PRESSURE DISTRIBUTION VALVE AND SYSTEM

BACKGROUND OF THE INVENTION

1. Field of the Invention

The present invention generally concerns fluid pressure brake and analogous systems and more particularly concerns multiple fluid-receiving points involving front and rear brake pressure modifying.

2. Discussion of the Prior Art

Generally, brake pressure distribution valves predeterminately control pressurized fluid to vehicle brakes to vary vehicle brake torque distribution dependent on vehicle deceleration levels. Low vehicle deceleration generally requires lower front axle torque relative to rear axle torque, such as torque distributions of 30 percent/70 percent, respectively. Federal Standards, e.g. FMVSS 105, will require compliance to shortened stopping distances which require higher deceleration levels resulting in significant increases in front axle torque. These torque increases can be of such a magnitude that they can result in, for example, front/rear torque distribution of 50 percent/50 percent, respectively. When 50 percent of the torque requirements are imposed on the front axle, certain undesirable effects result such as increased tendency for front wheel skid, reduced steering capability, high loading on all front axle components and increased rate of front brake lining and front tire wear. These undesirable effects can be significantly reduced by apportioning front axle torque in a manner which provides relatively low amounts of front axle torque during normal, low deceleration stops and increased amounts of such torque during the less frequent high deceleration, emergency or panic type stops. Therefore, it would be beneficial to have a brake pressure distribution valve capable of predeterminately controlling braking pressure to provide relatively low front axle torque during normal low deceleration stops and relatively high front axle torque during the less frequent high deceleration stops.

SUMMARY OF THE INVENTION

Accordingly, the present invention provides a valve capable of providing relatively low front axle torque during normal low deceleration stops and relatively high front axle torque during the less frequent high deceleration stops.

The foregoing is accomplished by providing a valve comprising a housing having a cavity formed therein. First and second pistons are movably mounted in the housing, each being resiliently urged in opposite directions. The second piston is slidably mounted on the first piston for relative movement therewith in response to certain predetermined pressure conditions whereas a retainer on the first piston can engage the second piston for unitary movement of both pistons under certain other predetermined pressure conditions. A first seal is provided to sealingly separate a first atmospheric portion at one end of the cavity from a pressurized fluid portion of the cavity. A second seal is provided to sealingly separate a second atmospheric portion at the other end of the cavity, opposite the one end, from the pressurized fluid portion. Ports in the housing permit pressurized fluid into and out of the pressurized fluid portion of the cavity whereupon the pressurized fluid can act on the first and second pistons to control fluid flow through the cavity proportioning pressure at the valve outlet at a predeterminately varying rate in relation to pressure at the valve inlet. If desired, a passage may be provided axially through the first piston to interconnect the first and second atmospheric portions of the cavity. In vehicle brake systems including a master cylinder, front and rear brakes and conduit interconnecting the master cylinder with the brakes, the valve may be interconnected with the conduit between the master cylinder and the front brakes to predeterminately control the flow of the pressurized fluid preferably to the front brakes as hereinabove described.

The novel features of the valve of this invention will become apparent from the following detailed description of the invention when considered in conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
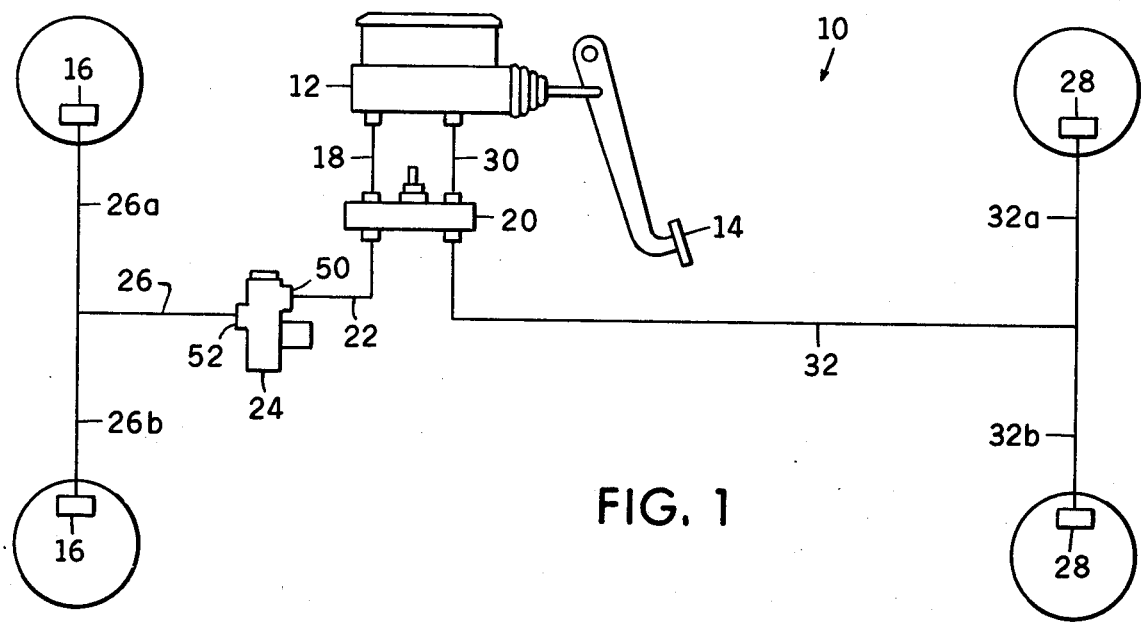
FIG. 1 diagrammetically illustrates a vehicle brake system including the valve of this invention.

Referring now to the drawings, a vehicle brake system is generally designated 10 and may include brake system components such as master cylinder 12 and brake pedal 14 operably connected thereto. Brake fluid in the master cylinder is conducted to front brake cylinders 16 via conduit 18, warning valve 20, conduit 22, brake pressure distribution valve 24, conduit 26 and brake conduits 26a, 26b. Brake fluid is similarly conducted to rear brake cylinders 28 via conduit 30, warning valve 20, conduit 32 and branch conduits 32a, 32b.

Brake pressure distribution valve 24 comprises housing 34 having cavity 36 formed therein. First and second fluid pressure responsive means such as first piston 38 and second piston 40 are movably mounted in cavity 36 and are each resiliently urged in opposite directions, toward each other, by first spring 42 and second spring 44, respectively, for relative movement in cavity 36. Seal means such as first seal 46 and second seal 48, are mounted on first and second pistons 38, 40, respectively, for sealingly separating pressurized fluid portion 36a of the cavity from atmospheric portions 36b, 36c. Port means such as inlet port 50 and outlet port 52 permit passage of pressurized fluid into and out of pressurized fluid cavity portion 36a. Retainer 54 is mounted on first piston 38 for engagement with second piston 40 to permit unitary movement of the first and second pistons in the cavity. First piston 38 may be provided with a passage 56 formed therethrough for interconnecting atmospheric cavity portions 36b, 36c as will be discussed later in more detail.

Valve 24 comprises housing 34 having generally annular cavity 36 formed therein and extending continuously through the housing from first end 58 to second end 60. Cavity 36 is generally stepped along the longitudinal axis of housing 34 to include threaded portion 62 and varying diameter stepped portions 64, 66, 68, 70 and 72. Annular groove 74 is formed in cavity 36 adjacent threaded portion 62 at the first end. Another annular groove 76 is formed in cavity 36 adjacent second end 60. Outer surface 78 of the housing may include extended portion 80 integrately formed with the housing for attachment to housing bracket 82. Inlet or first port 50 is formed adjacent first end 58 and includes threaded portion 84 and passageway 86 interconnecting the port 50 with cavity 36. Outlet or second port 52 is spaced between first and second ends 58, 60 respectively, and also includes a threaded portion 88 and passageway 90 interconnecting the port 52 with cavity 36. Housing 34 is preferably of cast iron or other suitable material and is machined to the desired specifications.

First piston 38 is generally annular and elongated and provided for placement in cavity 36. Piston 38 is preferably of aluminum and includes main body portion 92 adjacent first housing end 58 and elongated portion 94 integratedly formed with the main portion and extending therefrom in the direction of housing second end 60. Main portion 92 includes annular flanges 96, 98 of greater diameter than main portion 92 and spaced to provide annular groove 100 therebetween. Elongated portion 94 includes annular groove 102. Main portion 92 also includes cavity 104 formed therein and extending from open first end 106 of the piston toward piston second end 108 and terminating at end wall 110.

Second piston 40 is generally annular and provided for placement in cavity 36. Piston 40 is preferably of aluminum and includes annular passageway 112 extending therethrough and interconnecting piston first end 114 with piston second end 116.

First plug 118 is preferably of steel and formed to include threaded portion 120 provided to threadedly engage threaded portion 62 of housing 34. First end 122 of plug 118 includes flange 124 of greater diameter than threaded portion 120. Second end 126 of plug 118 includes first concentric recess 128 formed therein and extending toward plug first end 122. Second concentric recess 130 is of lesser diameter than first recess 128 and extends further toward plug first end 122. Bleed port 132 is formed in plug 118 to interconnect second recess 130 with first end 122 and utilimately to atmosphere. Annular groove 14 is formed in plug 118 between flange 124 and threaded portion 120.

Second plug 136 is preferably of steel and formed to include main annular body portion 138 integratedly formed with annular flange portion 140. Main portion 138 terminates at plug first end 142 and flange 140 terminates at plug second end 144 including annular chamfer 146.

When assembled, valve 24 includes first piston 38 with main portion on 92 adjacent housing first end 58 and elongated portion 94 extending toward housing second end 60. Second piston 40 is slidably mounted on elongated portion 94 so that the elongated portion outer annular surface 148 slidably engages inner annular surface 150 of passageway 112 through second piston 40. Resilient primary seal 152 is provided to seat in first concentric recess 128 of plug so that inner annular surface 154 of seal 152 sealingly but slidably engages outer annular surface 156 of main portion 92 and also so that outer annular surface 153 of seal 152 sealingly engages inner annular surface 129 of recess 128. Annular resilient metering seal 158 is inserted in cavity 36 so that outer annular surface 160 of the metering seal engages inner annular surface 66 of cavity 36. Also metering seal 158 is radially aligned with annular groove 100 of first piston 38. Annular first steel spring retainer ring 162 is provided to engage second end 126 of plug 118 for maintaining first spring 42 compressed between the retainer ring 162 and flange 96 of piston 38. Second concentric recess 130 of plug 118 is provided to accommodate first end 106 of piston 38 thus providing communication between cavity 104 of piston 38, second recess 130 of plug 118 and atmosphere. Sealing O-ring 164 is accommodated in radially aligned annular grooves 74, 134 when plug 118 is properly threadedly seated due to cooperative engagement of plug threaded portion 120 and housing threaded portion 62 so that plug flange 124 abuts first housing end 58.

Secondary resilient seal 48 abuts second piston 40 and includes outer annular surface 166 sealingly and slidably engaging inner annular surface 70 of cavity 36 whereas seal inner annular surface 168 sealingly and slidably engages outer annular surface 148 of elongated portion 94 of piston 38. Steel retainer ring 54 engages annular retainer groove 102 and protrudes radially outwardly beyond inner annular surface 150 of second piston passageway 112 slidably engaging outer annular surface 148 of elongated portion 94. Second steel spring retainer ring 176 abuts shoulder 178 between inner annular cavity walls 70, 72 and also may abut shoulder 180 of second piston 40 for retaining second steel spring 44 between ring 176 and flange 140 of second plug 136. Second plug 136 is retained in cavity 36 due to steel retainer ring 182 protruding radially inwardly from groove 76 to engage radially aligned annular chamfer 146.

Figure 2:
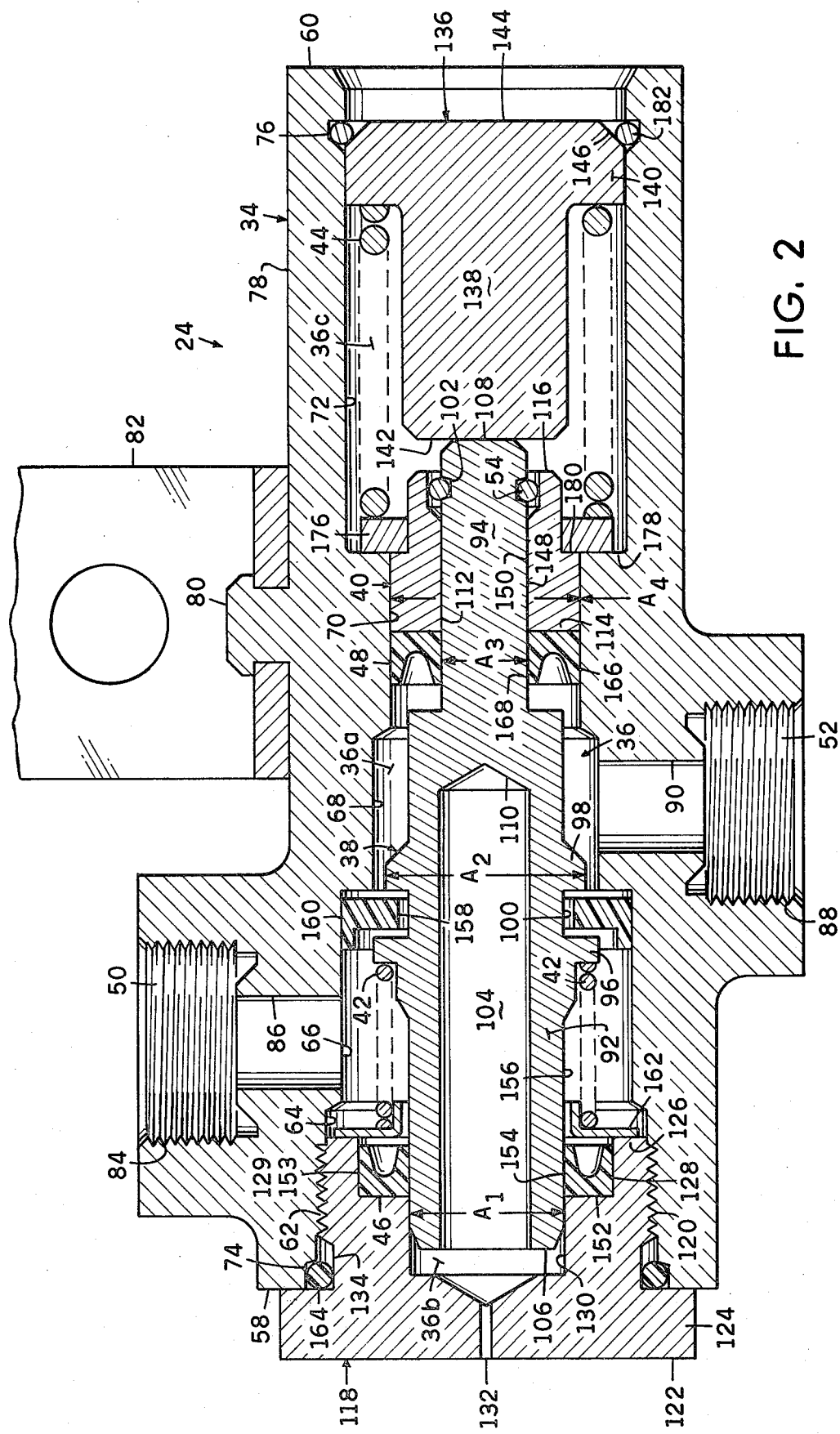
FIG. 2 illustrates a cross-sectional side elevation of the valve of this invention.

It can be seen that the operation of valve 24 is such that when assembled and at rest as illustrated in FIG. 2, the condition of valve 24 includes first piston 38 resiliently urged in a first direction toward second housing end 60 by spring 42 so that second end 108 of piston 38 abuts first end 142 of second plug 136 and second piston 40 resiliently urged in a second direction toward first housing end 58 by spring 44 due to engagement of retainer ring 176 with shoulder 180 of piston 40. A first atmospheric portion 36b adjacent housing first end 58 is defined within cavity 36 due to fluid communication between cavity 104 of piston 38, second concentric recess 130 of plug 118 and atmosphere via bleed port 132. A second atmospheric portion 36c adjacent housing second end 60 is defined within cavity 36 due to fluid communication between second piston 40 and atmosphere in view of the non-sealing retainer ring 182 retaining second plug 136 in place. Also defining the atmospheric portions and sealingly interposed therebetween by seals 46, 48 and 164 is pressurized fluid portion 36a in communication with inlet, outlet ports 50, 52, respectively.

Figure 4:
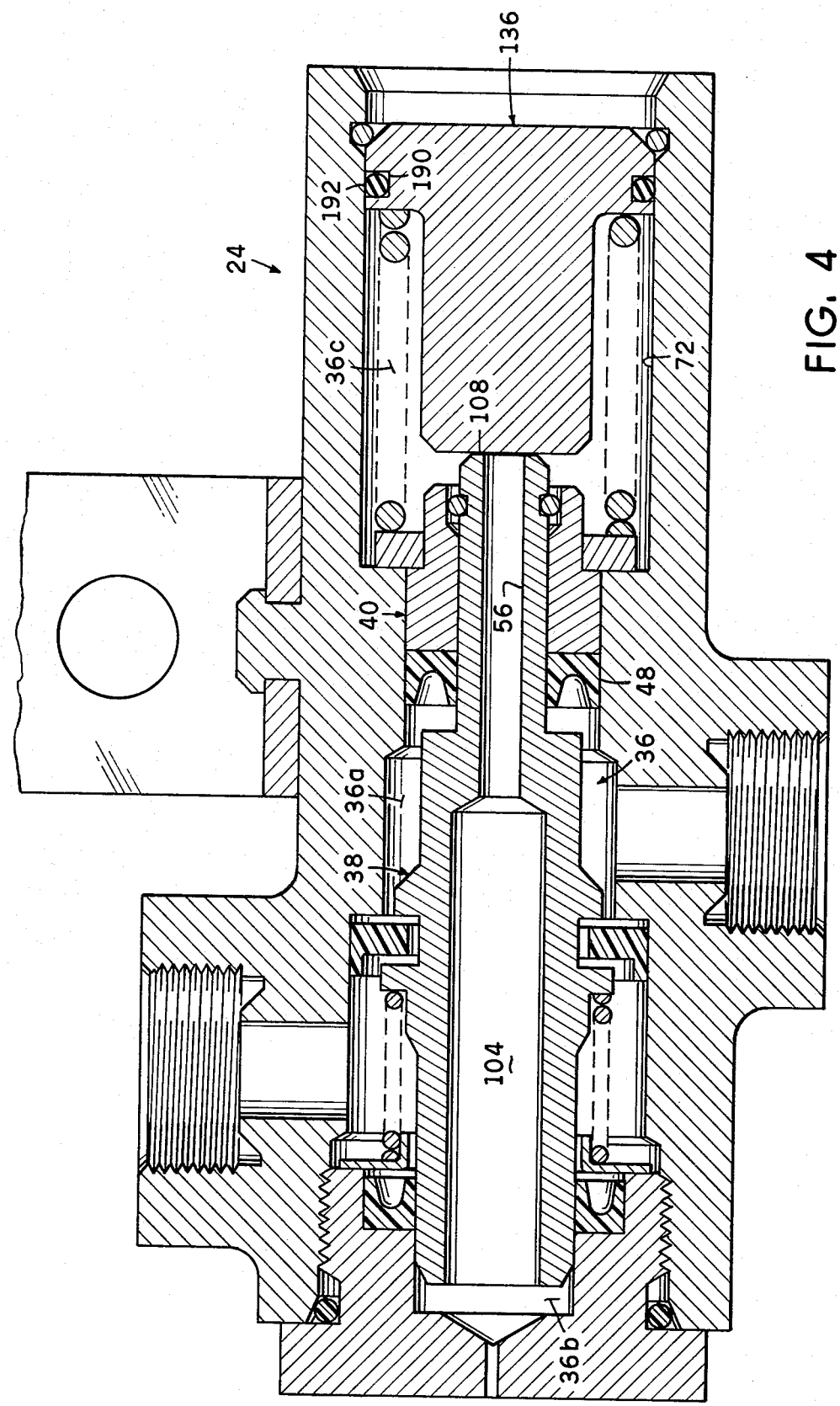
FIG. 4 illustrates a cross-sectional side elevation of an alternate construction of the valve of this invention.

In the alternative embodiment shown in FIG. 4, a passageway 56 is illustrated in piston 38 to communicate cavity 104 and second end 108 of first piston 38 thus effectively permitting fluid communication between first and second atmospheric portins 36b, 36c, respectively. Also, if desired, annular groove 190 may be provided in flange 140 for accommodating O-ring 192 to sealingly engage plug 136 with inner annular surface 72 of cavity 36. An important advantage offered by this alternative embodiment is that should leak develop past the secondary seal 48, permitting fluid to pass from pressurized fluid portion 36a into atmospheric portion 36c, a buidlup of pressurized fluid in the atmospheric portion 36c could eventually cause a hydraulic lock witth respect to second piston 40 which could prevent engagement of piston 38 and piston 40.

The addition of passageway 56, however, would communicate both atmospheric portions 36b, 36c and result in a pressure balanced relationship therebetween thus avoiding such a hydraulic lock.

Advantageously, a vehicle brake system such as that illustrated in FIG. 1 can incorporate a brake pressure distribution valve such as valve 24 placed between the master cylinder and either the front or rear brakes. For example, FIG. 1 illustrates a preferred vehicle brake system 10 having conduit 22 interconnecting inlet port 50 for pressurized fluid communication with master cylinder 12 and conduit 26 interconnecting outlet port 52 for pressurized fluid communication preferably with front brake cylinders 16.

Due to the various predetermined cross-sectional areas $A_1$, $A_2$ and $A_3$ included on piston 38 and due to the cross-sectional area $A_4$ on piston 40, fluid in pressurized portion 36a of cavity 36 operates on the fluid pressure responsive pistons to proportion the flow of that fluid under pressure between inlet 50 and outlet 52 of valve 24 so that the outlet pressure P(out) is modified or proportioned in relation to the inlet pressure P(in). Also determinative of the fluid pressure modification are the spring biased relative and unitary movement capabilities of first and second pistons 38, 40, respectively, and the fluid metering relationship between piston 38 and metering seal 158.

Fluid communication between master cylinder 12 and brake cylinders 16 is constantly maintained through the pressurized fluid portion or passageway 36a interconnecting inlet, outlet ports 50, 52, respectively. When braking is actuated and fluid pressure in the system increased, as shown on the pressure relationship curve of FIG. 3, initially a first predetermined fluid pressure condition exists in the cavity wherein the inlet, outlet pressure ratio is 1/1, that is, P(out) equals P(in) as designated by line OA where the rate of fluid pressure increase at the first and second ports is substantially equal.

Figure 3:
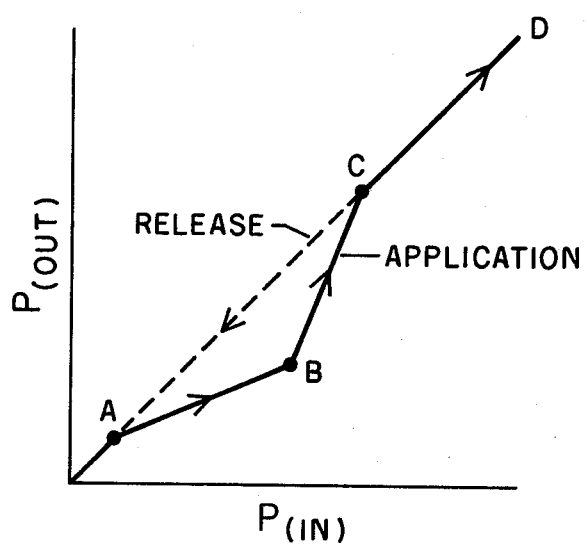
FIG. 3 graphically illustrates a pressure distribution curve effected by the valve of this invention.

The 1/1 ratio is maintained in the pressurized fluid portion 36a of cavity 36 until eventually the fluid pressure acting on area $(A_1-A_3)$ overcomes the force of the primary spring 42 (Fps). Piston 38 begins to respond to fluid pressure acting thereon and moves to the left as viewed in FIG. 1. This causes flange 98 to move into proximity with metering seal 158 thus restricting or metering the flow of fluid between inlet port 50 and outlet port 52. At this point the outlet pressure has reached a first transition point (point A, FIG. 3). Under these conditions as seen in FIG. 3, a second predetermined fluid pressure condition exists in the cavity wherein the rate of fluid pressure increase at inlet port 50 is greater than the rate of fluid pressure increase at outlet port 52 as designated by line AB. This pressure condition can be expressed by the reltionship P(out) = $[P(in)(A_2-A_1) + Fps]/(A_2-A_3)$. This input-output pressure relationship continues and eventually P(out) acting on area $(A_4-A_3)$ overcomes the force of secondary spring 44 (Fss) and piston 40 begins to respond to fluid pressure acting thereon and moves to the right. Then, due to radilly protruding retainer ring 54 mounted on elongated portion 94 of piston 38, relatively movable pistons 38, 40 are engaged for permitting unitary movement of the pistons. At this point P(out) reaches a second transition point (point B, FIG. 3). Under these conditions as seen in FIG. 3, a third predetermined fluid pressure condition exists in the cavity wherein the rate of fluid pressure increase at outlet port 52 is greater than the rate of fluid pressure increase at inlet port 50 as designated by the line BC. This pressure condition can be expressed by the relationship P(out) = $[P(in)(A_2-A_1) + Fps - Fss]/(A_2-A_4)$.

This inlet-outlet pressure relationship is maintained until the force resulting from P(out) acting on $(A_4-A_1)$ equals the force of spring 44 (Fss) minus the force of spring 42 (Fps) which may be expressed by the relationship P(out) = $(Fss - Fps)/(A_4-A_1)$.

At this point P(out) reaches a third transition point (point C, FIG. 3). Under these conditions as seen in FIG. 3, the rate of fluid pressure increase at inletoutlet ports 50, 52, respectively is again substantially equal to a 1/1 ratio as represented by the line CD. Point C is generally referred to as the blend point and the blend point pressure $P_{(B)}$ can be expressed by the relationship $P_{(B)}$ = Fss - Fps/$(A_4-A_1)$. Fluid pressure above the blend point $P_{(B)}$ will result in first and second pistons 38, 40, respectively, moving to the right as a unit until end 108 of piston 38 engages end 142 of plug 136 and flange 98 moves out of proximity with metering seal 158 thus opening the previously imposed restricted metering of the flow of fluid through the pressurized fluid portion 36a.

During brake release P(in) and P(out) decay at 1/1 ratio as shown in FIG. 3.

During actuation of brake pedal 14 valve 24 operates to control pressurized fluid to the vehicle brakes to vary brake torque distribution between the front and rear axles dependent on vehicle deceleration levels. Normal or low deceleration requires torque distribution in the approximate range of 30 percent/70 percent, between the front and rear axles. During such deceleration the brakes require outlet pressure in the ranges illustrated by lines OA and AB of the curve of FIG. 3. Higher deceleration levels imposing, for example, front/rear torque distribution of 50 percent/50 percent require the ranges illustrated on the brake application curve by lines BC and CD.

The foregoing thus describes a brake pressure distribution valve 24, capable of predeterminately controlling braking pressure to provide relatively low front axle torque during normal low deceleration stops and relatively high front axle torque during the less frequent high deceleration stops.

Obviously many modifications and variations of the present invention are possible in the light of the above teachings. It is therefore to be understood that within the scope of the appended claims the invention may be practices otherwise than as specifically described.

Having thus described the invention in its best embodiment and mode of operation, that which is desired to be claimed by Letters Patent is:

1. A brake pressure distribution valve comprising:
   a housing having a cavity formed therein;
   first and second fluid responsive means movable mounted in the housing, each being resiliently urged in opposite directions for relative movement therebetween;
   first sealing means mounted on the first fluid pressure responsive means for sealingly separating a first atmospheric portion at a first end of the cavity from a pressurized fluid portion of the cavity;
   second sealing means mounted on the second fluid pressure responsive means for sealingly separating the pressurized fluid portion of the cavity from a second atmospheric portion at a second end of the cavity opposite the first end;
first port means for permitting passage of pressurized fluid into the pressurized fluid portion of the cavity;
second port means for permitting passage of the pressurized fluid out of the pressurized fluid portion of the cavity;
retainer means on the first fluid pressure responsive means for engaging the second fluid responsive means for unitary movement of the first and second fluid pressure responsive means;
metering means in the pressurized fluid portion of the cavity in proximity with the first fluid pressure responsive means for metering the flow of pressurized fluid between the first and second port means;
the first fluid pressure responsive means includes an elongated portion extending from the pressurized fluid portion of the cavity into the second atmospheric portion of the cavity; and
the second fluid pressure responsive means is movably mounted on the elongated portion.

2. The valve of claim 1, wherein:
the first fluid pressure responsive means includes a passage extending therethrough interconnecting the first and second atmospheric portions of the cavity.

3. A brake pressure distribution valve comprising:
a housing;
first port means formed in the housing for permitting the passage of fluid into the housing;
second port means formed in the housing for permitting the fluid to pass from the housing;
the housing including a cavity interconnecting the first and second port means;
first fluid pressure responsive means movable in the cavity and urged in a first direction by a first resilient member and responsive to fluid pressure at a predetermined fluid pressure condition in the cavity wherein the rate of fluid pressure increase at the first port is substantially equal to the rate of fluid pressure increase at the second port, for movement in a second direction, opposite the first direction against the urging of the first resilient member and into proximity with a metering member mounted in the cavity;
an elongated portion included on and extending from the first fluid pressure responsive means in the first direction;
second fluid pressure responsive means movable in the cavity and urged in the second direction by a second resilient member and responsive to fluid pressure at a predetermined fluid pressure condition in the cavity wherein the rate of fluid pressure increase at the first port is greater than the rate of fluid pressure increase at the second port for movement in the first direction against the urging of the second resilient member, the second fluid pressure responsive means including aperture means formed axially therethrough for slidably accommodating the elongated portion of the first fluid pressure responsive means;
retainer means mounted on the elongated portion for engaging the second fluid pressure responsive means and for permitting unitary movement of the first and second fluid pressure responsive means in the first direction at a predetermined fluid pressure condition in the cavity wherein the rate of fluid pressure increase at the second port is greater than the rate of fluid pressure increase at the first port;
first seal means on the first fluid responsive means for sealingly separating a first atmospheric portion at one end of the cavity from a pressurized fluid portion of the cavity;
second seal means on the second fluid responsive means for sealingly separating a second atmospheric portion at the other end of the cavity, opposite the one end, from the pressurized fluid portion of the cavity;
the elongated portion extending from the pressurized fluid portion into the second atmospheric portion; and
a passage extends through the first fluid pressure responsive means interconnecting the first and second atmospheric portions.

4. A brake pressure distribution valve comprising:
a housing;
first port means formed in the housing for permitting the passage of fluid into the housing;
second port means formed in the housing for permitting the fluid to pass from the housing;
the housing including a cavity interconnecting the first and second port means;
a first piston movable in the cavity and urged in a first direction by a first resilient member when fluid pressure in the cavity is at a first predetermined fluid pressure condition wherein the rate of fluid pressure increase at the first port is substantially equal to the rate of fluid pressure increase at the second port;
an elongated portion included on and extending from the first piston in the first direction;
a second piston movable in the passage and urged in a second direction, opposite the first direction, by a second resilient member when fluid pressure in the cavity is at the first fluid pressure condition, the second piston including aperture means formed axially therethrough for slidably accommodating the elongated portion of the first piston;
the first piston movable in the second direction against the urging of the first resilient member and into proximity with a metering member when fluid pressure in the cavity is at the first predetermined fluid pressure condition;
the second piston movable in the first direction against the urging of the second resilient member when fluid pressure in the cavity is at a second fluid pressure condition wherein the rate of fluid pressure increase at the first port is greater than the rate of fluid pressure increase at the second port;
retainer means mounted on the elongated portion for engaging the second piston and for permitting unitary movement of the first and second pistons in the first direction at a third predetermined fluid presuures condition in the cavity wherein the rate of fluid pressure increase at the second port is greater than the rate of fluid pressure increase at the first port;
first seal means on the first piston for sealingly separating a first atmospheric portion at one end of the cavity from a pressurized fluid portion of the cavity;
second seal means on the second piston for sealingly separating a second stmospheric portion at the other end of the cavity, opposite the one end, from the pressurized fluid portion of the cavity;

the elongated portion extending form the pressurized fluid portion into the second atmospheric portion; and a passage extends through the first piston interconnecting the first and second atmospheric portions.

5. In a vehicle brake system including a master cylinder, front and rear brakes, conduit interconnecting the master cylinder with the front and rear brakes, and a brake pressure distribution valve interconnected with the conduit between the master cylinder and the brakes, the improvement comprising:

a housing having a cavity formed therein;

first and second fluid responsive means movably mounted in the housing, each being resiliently urged in opposite directions for relative movement therebetween;

first sealing means mounted on the first fluid pressure responsive means for sealingly separating a first atmospheric portion at a first end of the cavity from a pressurized fluid portion of the cavity;

second sealing means mounted on the second fluid pressure responsive means for sealingly separating the pressurized fluid portion of the cavity from a second atmospheric portion at a second end of the cavity opposite the first end;

first port means for permitting passage of pressurized fluid into the pressurized fluid portion of the cavity;

second port means for permitting passage of the pressurized fluid out of the pressurized fluid portion of the cavity;

retainer means on the first fluid pressure responsive means for engaging the second fluid responsive means for unitary movement of the first and second fluid pressure responsive means;

metering means in the pressurized fluid portion of the cavity in proximity with the first fluid pressure responsive means for metering the flow of pressurized fluid between the first and second port means;

the first fluid pressure responsive means includes and elongated portion extending from the pressurized fluid portion of the cavity into the second atmospheric portion of the cavity; and the second fluid pressure responsive means is movably mounted on the elongated portion.

6. The system of claim 5, wherein:

the first fluid pressure responsive means includes a passage extending therethrough interconnecting the first and second atmospheric portions of the cavity.

7. In a vehicle brake system including a master cylinder, front and rear brakes, conduit interconnecting the master cylinder with the front and rear brakes, and a brake pressure distribution valve interconnected with the conduit between the master cylinder and the brakes, the improvement comprising:

a housing;

first port means formed in the housing for permitting the passage of fluid into the housing;

second port means formed in the housing for permitting the fluid to pass from the housing;

the housing including a cavity interconnecting the first and second port means;

first fluid pressure responsive means movable in the cavity and urged in a first direction by a first resilient member and resonsive to fluid pressure at a predetermined fluid pressure condition in the cavity wherein the rate of fluid pressure increase at the first port is substantially equal to the rate of fluid pressure increase at the second port, for movement in a second direction, opposite the first direction against the urging of the first resilient member and into proximity with a metering member mounted in the cavity;

an elongated portion included on and extending from the first fluid responsive means in the first direction;

second fluid pressure responsive means movable in the cavity and urged in the second direction by a second resilient member and responsive to the fluid pressure at a predetermined fluid pressure condition in the cavity wherein the rate of fluid pressure increase at the first port is greater than the rate of fluid presssure increase at the second port for movement in the first direction against the urging of the second resilient member, the second fluid responsive means including aperture means formed axially therethrough for slidably accommodating the elongated portion of the first fluid responsive means;

retainer means mounted on the elongated portion for engaging the second fluid responsive means and for permitting unitary movement of the first and second fluid responsive means in the first direction at a predetermined fluid pressure condition in the cavity wherein the rate of fluid pressure increase at the second port is greater than the rate of fluid pressure increase at the first port;

first seal means on the first fluid responsive means for sealingly separating a first atmospheric portion at one end of the cavity from a pressurized fluid portion of the cavity;

second seal means on the second fluid responsive means for sealingly separating a second atmospheric portion at the other end of the cavity, opposite the one end, from the pressurized fluid portion of the cavity;

the elongated portion extending from the pressurized fluid portion into the second atmospheric portion; and a passage extends though the first fluid pressure responsive means interconnecting the first and second atmospheric portions.

8. In a vehicle brake system including a master cylinder, front and rear brakes, conduit interconnecting the master cylinder with the front and rear brakes, and a brake pressure distribution valve interconnected with the conduit between the master cylinder and the brakes, the improvement comprising:

a housing;

first port means formed in the housing for permitting the passage of fluid into the housing;

second port means formed in the housing for permitting the fluid to pass from the housing;

the housing including a cavity interconnecting the first and second port means;

a first piston movable in the cavity and urged in a first direction by a first resilient member when fluid presure in the cavity is at a first predetermined fluid pressure condition wherein the rate of fluid pressure increase at the first port is substantially equal to the rate of fluid pressure increase at the second port;

an elongated portion included on and extending from the first piston in a first direction;

a second piston movable in the passage and urged in a second direction, opposite the first direction, by a second resilient member when fluid pressure in the cavity is at the first fluid pressure condition, the second piston including aperture means formed axially therethrough for slidably accommodating the elongated portion of the first piston;

the first piston movable in the second direction against the urging of the first resilient member and into proximity with a metering member when fluid pressure in the cavity is at the first predetermined fluid pressure conditon;

the second piston movable in the first direction against the urging of the second resilient member when fluid pressure in the cavity is at a second fluid pressure condition wherein the rate of fluid pressure increase at the first port is greater than the rate of fluid pressure increase at the second port;

retainer means mounted on the elongated portion for engaging the second piston and for permitting unitary movement of the first and second pistons in the first direction at a third predetermined fluid pressure conditon in the cavity wherein the rate of fluid pressure increase at the second port is greater than the rate of fluid pressure increase at the first port;

first seal means on the first piston for sealingly separating a first atmospheric portion at one end of the cavity from a pressurized fluid portion of the cavity;

second seal means on the second piston for sealingly separating a second stmospheric portion at the other end of the cavity, opposite the one end, from the pressurized fluid portion of the cavity;

the elongated portion extending from the pressurized fluid portion into the second atmospheric postion; and a passage extends through the first piston interconnecting the first and second atmospheric portions.

* * * * *

UNITED STATES PATENT OFFICE
CERTIFICATE OF CORRECTION

PATENT NO. : 3,992,063
DATED : November 16, 1976
INVENTOR(S) : Edward J. Falk

It is certified that error appears in the above-identified patent and that said Letters Patent are hereby corrected as shown below:

Column 3, line 2, "integrately" should be -- integratedly --; line 42, "14" should be -- 134 --; line 51, after "portion" delete -- on --. Column 4, line 62, after "should" insert -- a --. Column 5, line 56, delete "9" and insert -- ) --. Column 6, line 52, "practises" should be -- practiced --. Column 8, line 57, "presuures" should be -- pressure --. Column 9, line 1, "form" should be -- from --; line 39, "and" should be -- an --. Column 12, line 15, "postion" should be -- portion --.

Signed and Sealed this

Eighth Day of February 1977

[SEAL]

*Attest:*

RUTH C. MASON
*Attesting Officer*

C. MARSHALL DANN
*Commissioner of Patents and Trademarks*